United States Patent [19]
Tozaki

[11] Patent Number: 5,179,453
[45] Date of Patent: Jan. 12, 1993

[54] RECORDING MEDIUM PLAYBACK APPARATUS INCLUDING A VARIABLE COMPENSATION CIRCUIT

[75] Inventor: Akihiro Tozaki, Tokorozawa, Japan

[73] Assignee: Pioneer Electronic Corporation, Tokyo, Japan

[21] Appl. No.: 679,986

[22] Filed: Apr. 3, 1991

[30] Foreign Application Priority Data

Aug. 22, 1990 [JP] Japan ................... 2-220503

[51] Int. Cl.$^5$ ............................................. H04N 5/94
[52] U.S. Cl. .................................. 358/336; 358/335; 358/342; 360/38.1
[58] Field of Search ............... 358/310, 314, 335, 336, 358/36, 37, 167, 166, 342, 322; 360/38.1, 33.1

[56] References Cited

U.S. PATENT DOCUMENTS

| | | | |
|---|---|---|---|
| 4,470,065 | 9/1984 | Reitmier | 358/336 |
| 4,517,600 | 5/1985 | Reitmeier | 358/336 |
| 4,716,565 | 12/1987 | Suma | 358/314 |
| 4,843,457 | 6/1989 | Yamagata | 358/314 |
| 4,891,699 | 1/1990 | Hamada et al. | 358/314 |
| 4,937,680 | 6/1990 | Kawasaki | 358/336 |

FOREIGN PATENT DOCUMENTS 63-175595  7/1988  Japan .

Primary Examiner—Tommy P. Chin
Assistant Examiner—Thai Tran
Attorney, Agent, or Firm—Sughrue, Mion, Zinn, Macpeak & Seas

[57] ABSTRACT

A recording medium playback apparatus for production of a composite video signal by combining a multiplicity of H-line video signals reproduced from playback of a plurality of recording media which carry different video signals respectively is provided in which when some H-line video signals are absent in the composite video signal, the number of the absent H-line video signals are examined and then, compensation for the absent H-line video signals is executed by interpolation between two, preceding and succeeding, H-line video signals if the number is not more than a given value or by holding a row of the preceding H-line video signals if the number exceeds the given value.

13 Claims, 10 Drawing Sheets

Fig. 7A

```
                    ─────────────────── Y1
    DIS ─────────────────── Y2
                    ─────────────────── Y3
                    ─────────────────── Y4
                    ─────────────────── Y5
    DIS ─────────────────── Y6
                    ─────────────────── Y7
```

Fig. 7B

```
                    ─────────────────── Y1
    DIS ─────────────────── Y2
    DIS ─────────────────── Y3
                    ─────────────────── Y4
    DIS ─────────────────── Y5
    DIS ─────────────────── Y6
                    ─────────────────── Y7
```

Fig. 7C

```
                    ─────────────────── Y1
    DIS ─────────────────── Y2
    DOS ─────────────────── Y3
                    ─────────────────── Y4
    DIS ─────────────────── Y5
                    ─────────────────── Y6
                    ─────────────────── Y7
```

Fig. 7D

```
                    ─────────────────── Y1
    DIS ─────────────────── Y2
    DIS ─────────────────── Y3
    DOS ─────────────────── Y4
    DIS ─────────────────── Y5
    DIS ─────────────────── Y6
                    ─────────────────── Y7
```

Fig. 12

|   | I | II | III | IV | V | VI | VII |
|---|---|----|-----|----|---|----|-----|
| X1 | x | x | 1 | x | o | x | x |
| X2 | x | 1 | o | 1 | o | o | x |
| X3 | 1 | o | o | o | o | o | o |
| X4 | x | 1 | 1 | o | 1 | o | o |
| X5 | x | x | x | 1 | x | 1 | o |
| a | o | o | β | o | o | o | o |
| b | o | 1/2 | o | α | o | o | o |
| c | 1 | o | o | o | o | o | 1 |
| d | o | 1/2 | α | o | 1 | o | o |
| e | o | o | o | β | o | 1 | o |

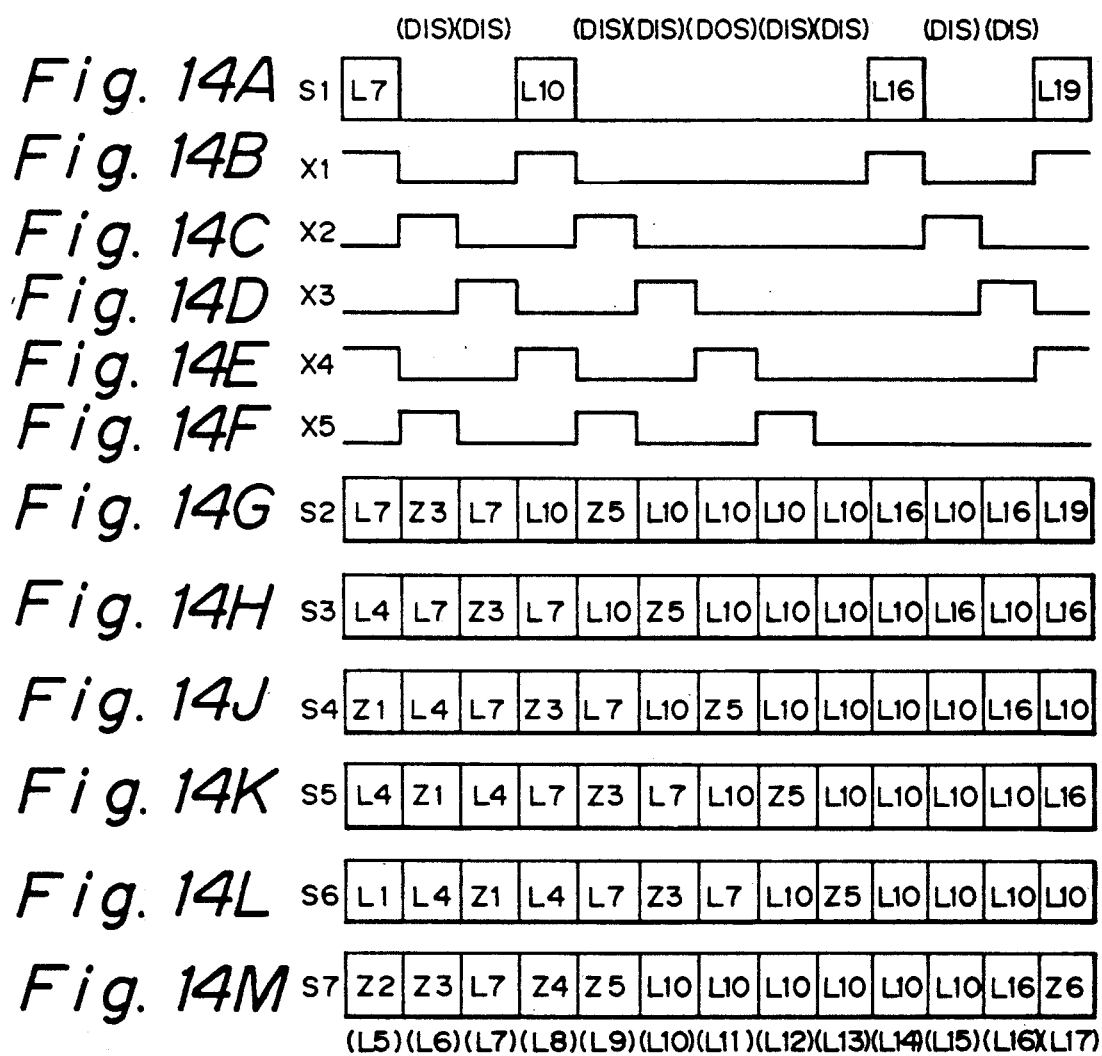

RECORDING MEDIUM PLAYBACK APPARATUS INCLUDING A VARIABLE COMPENSATION CIRCUIT

BACKGROUND OF THE INVENTION

1. Field of the Invention

The present invention relates to a recording medium playback apparatus for combination of a multiplicity of video signals, each corresponding to an H-line, reproduced through simultaneous playback of a plurality of recording mediums carrying different video signals.

2. Description of the Prior art

It is essential for recording and playing back a high definition TV signal, which is a data signal having a wide band of frequencies, into and from a recording medium, e.g. a video disk, to enhance the density of recording or increase the rotating speed of a spindle motor, whichever will handily be realized by the up-to-date techniques.

Such an improved method has been developed in which a high definition TV signal is frequency divided into a plurality of video signals which are then recorded onto a set of video disks and during playback, the video signals reproduced through playing back of the video disks with a plurality of players actuated simultaneously are combined together in H-lines for reproduction of a video image, as disclosed in Japanese Patent Laid-open No.63-175595.

FIG. 1 shows the waveform of three channel signals which are derived from a high definition TV signal and reproduced through playing back three video disks with three disk players. The three channel signals are then combined in H-lines for reproduction of a picture.

In this method, a jump to a desired frame can be carried out with fair smoothness by actuating one or two of the three players for specific playback operation, e.g. search or scanning, although a decrease in the quality of a reproduced image is inevitable more or less. Reproduced signals from the player(s) actuated in the specific playback mode are not appropriate for use. Thus, they have to be compensated using a normal signal from the remaining one or two players actuated in the normal playback mode. It is, however, known that when a target picture contains movement, compensation with a corresponding H-line of the preceding frame tends to result in drift of the preceding frame image. Accordingly, the compensation is preferably conducted using adjoining or adjacent line signals of the same frame.

Such a compensation circuit acts similarly to a dropout compensation circuit and, thus, will be appropriated for common use. This technique has been proposed by the Applicant of the present application, as disclosed in Japanese Patent Application 2-143594.

FIG. 2 is a block diagram showing such a common use application. As shown, DOS represents a dropout detection signal. (In this embodiment, a dropout is expressed by the logic state "0".) Also, DIS represents a disable signal indicating the disable state in which no normal video signal is available, e.g., a specific playback mode (and which is also expressed by the logic state "0"). DOS and DIS are supplied to an OR gate 33 which in turn delivers an output DO to a dropout compensation circuit 34.

FIG. 3 illustrates a common dropout compensation circuit. When DO is at logic "1", a switch 34b is turned to the side A and, thus, an input signal becomes an output signal directly. When DO is at logic "0", the switch 34b is shifted to the side B allowing an input signal for the preceding H-line from a 1 H-line delay circuit 34a to become an output signal. As understood, if dropout or disable state occurs in a row of two or more H-lines, compensation cannot be executed.

FIG. 4 shows an improved circuit for compensation with cyclic action, in which the input of the 1 H-line delay circuit 34a is connected to the output of the switch 34b. Accordingly, when a series of DOS for consecutive H-lines are at logic "0", a normal video signal of the preceding H-line is constantly fed in, allowing continuous compensation. However, the compensation circuit is intended to deliver a series of the same H-line signals thus causing vertical foldover to appear in a reproduced image which will thus decline in quality.

Particularly during a specific playback mode in which pickups on two of the three players are actuated for jump action, a couple of video signals for two consecutive H-lines will be absent more frequently. A problem is that the known compensation method using a normal H-line video signal cannot offset such absence.

SUMMARY OF THE INVENTION

It is an object of the present invention to provide a recording medium playback apparatus for producing a composite video signal by combining in H-lines a plurality of video signals reproduced from recording media carrying different video signals, which is provided with an improved dropout compensation circuit capable of diminishing vertical foldover effects during its dropout or disable state compensating action.

Thus, a recording medium playback apparatus of the present invention, which contains a plurality of players for playback of their respective recording media carrying different video signals and a composite means for producing a composite video signal by combining a multiplicity of video signals, each being assigned to an H-line, reproduced with the players, comprises a discrepancy detecting means for producing a discrepancy signal upon detecting the absence of an H-line video signal in the composite video signal reproduced from the recording media and a compensating means for compensating for the absent H-line video signal in the composite video signal in accordance with the discrepancy signal, the compensating means being arranged so that after the number of the consecutive discrepancy signals is examined, compensation for the absent H-line video signals is executed with the use of an interpolation signal produced from two, preceding and succeeding, H-line video signals if the number is not more than a given value and with a row of the preceding H-line video signals if the number is more than the given value.

Accordingly, the recording medium playback apparatus provides, during production of a composite video signal by combining a multiplicity of H-line video signals reproduced from playback of a plurality of recording media which carry different video signals respectively, a compensation procedure which comprises the steps of generating a discrepancy signal if the absence of an H-line video signal in the composite video signal is detected, examining the number of the consecutive discrepancy signals, and conducting compensation with the use of an interpolation signal produced from preceding and succeeding H-line signals if the number is not more than a given value or with the holding of the preceding H-line signal prior to absent H-lines if the number is more than the given value.

BRIEF DESCRIPTION OF THE DRAWINGS

FIGS. 7-a to 7-d are diagram showing signals in the circuit shown in FIG. 6;

FIG. 12 is a table showing the action of the circuit shown in FIG. 6;

FIGS. 13A to 13M show a timing chart of signals across the circuit shown in FIG. 6; and FIGS. 14A to 14M show a timing chart of signals across the same circuit.

DETAILED DESCRIPTION OF PREFERRED EMBODIMENT

One preferred embodiment of the present invention will be described referring to the accompanying drawings.

Figure 5:
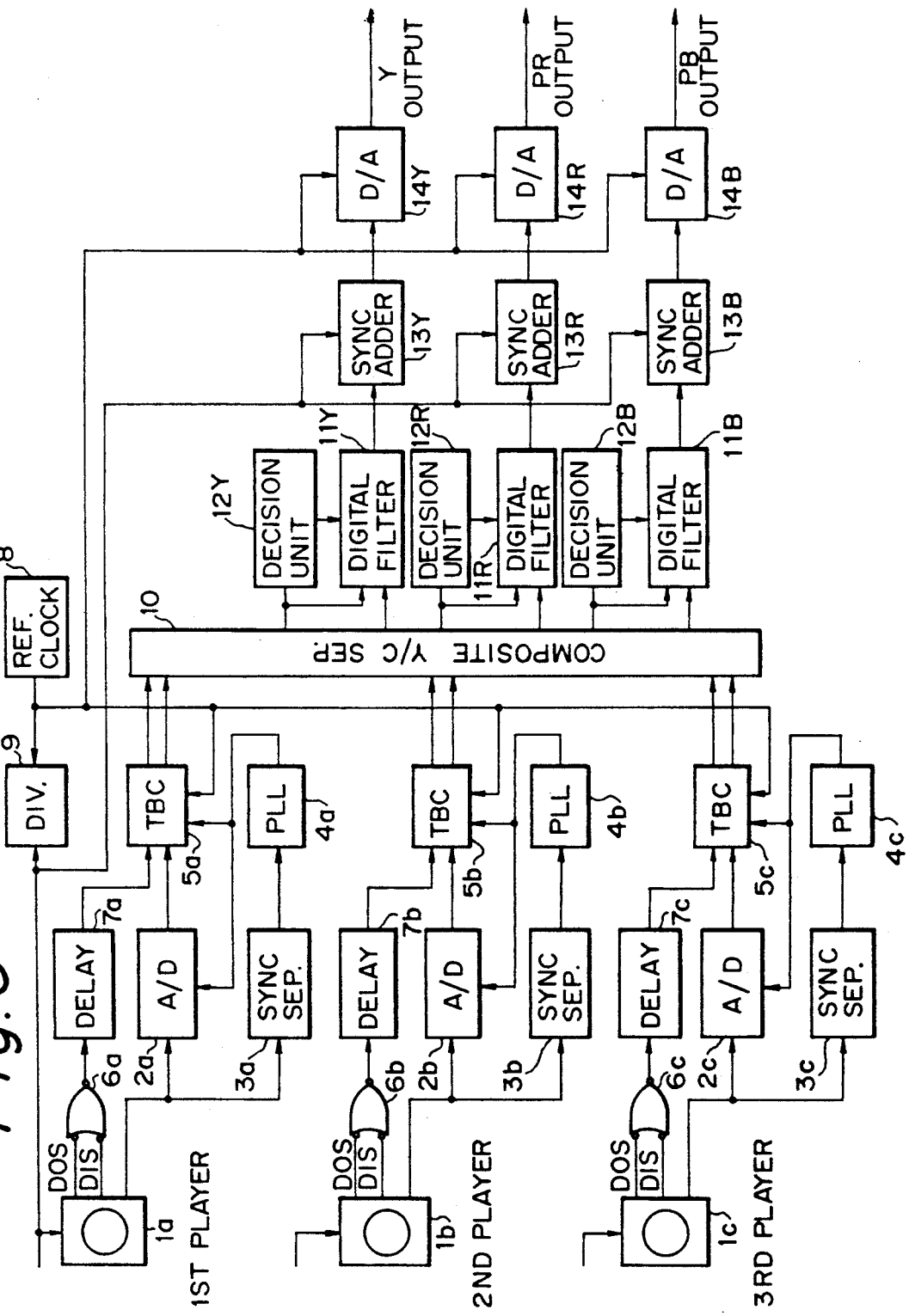
FIG. 5 is a block diagram showing one embodiment of the present invention.

FIG. 5 is a diagram showing a three-player playback system. There are provided three players on which one set of three disks are simultaneously played back for output of analog video signals, respectively, each player thus containing a spindle motor, a pickup, a demodulator circuit, a servo circuit, a controller circuit, and so on.

Also, each player is provided with a dropout detecting circuit and a disable signal generating circuit. When a dropout occurs, the former produces a dropout detection signal (abbreviated as DOS hereinafter) corresponding to the dropout video signal. When such a disable state is induced as a specific reproduction mode, e.g. search or scanning, in which no normal video signals are provided, the latter produces a disable signal (abbreviated as DIS hereinafter).

The three video signal outputs from the respective players are then combined into a composite video signal. This procedure is common for the three players and thus, the signal processing in the system will now be described with respect to the video signal from a first player 1a.

The analog video signal from the first player 1a is fed to an A/D converter circuit 2a and to a sync separator circuit 3a. A sync signal from the sync separator 3a is then supplied to a PLL circuit 4a which in turn delivers a playback clock pulse. The clock pulse is transferred to the A/D converter circuit 2a. Thus, the A/D converter circuit 2a converts the analog video signal with timing of the playback clock signal into a digital video signal (referred to as a video signal hereinafter) which is then fed to a TBC (time-base compensation) circuit 5a.

Both DOS and DIS are supplied via an OR gate 6a to a delay circuit 7a where they are delayed by a time, which is equivalent to the delay in the conversion at the A/D convertor circuit 2a, for elimination of time lag and then, transferred to the TBC circuit 5a.

The TBC circuit 5a which is mainly consisted of, e.g., a FIFO device carries out time-base compensation of a video signal using the playback clock pulse which serves as a write clock and the reference clock pulse which is supplied from a reference clock generator 8 and serves as a read clock pulse. The sync signal is kept aside during write operation and, after read operation, will be added.

The reference clock pulse is also supplied to a divider 9 for generation of a reference sync signal which is then fed to the three players for control on the rotation of their respective spindle motors.

The video signal from the TBC circuit 5a is transferred together with two other video signals from TBC circuits 5b and 5c to a composite circuit 10. A composite video signal from the composite circuit 10 is divided by Y/C separation into a luminance signal and a chrominance signal which are delivered in three different channels Y, PR and PB.

A signal Y from the composite circuit 10 is fed via a digital filter 11Y to a sync adder circuit 13Y where a sync signal is added to the signal Y. A resultant signal is then converted by a D/A converter circuit 14Y back to an analog video signal which is further delivered to a display driver (not shown). Other signals PR and PB are also processed in the same manner.

An OR signal from DOS and DIS is time-base compensated and fed to the composite circuit 10 where it is combined with other two OR signals and a resultant composite signal is then Y/C separated for output in Y, PR, and PB channels.

Three channel OR signals are supplied to decision units 12Y, 12R, and 12B, respectively, where the number of channel signals generated in sequence is examined and corresponding decision signals are then delivered to the digital filters 11Y, 11R, and 11B respectively.

Figure 6:
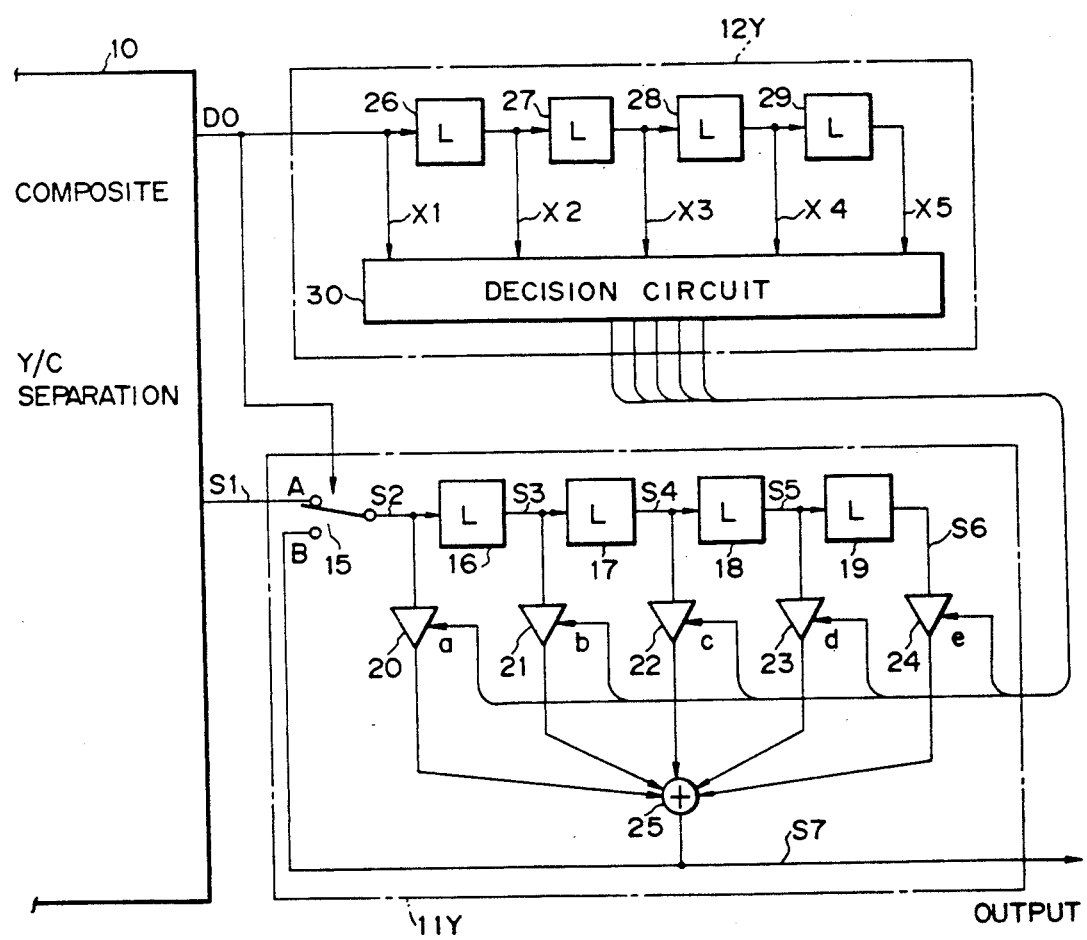
FIG. 6 is a circuit diagram showing a primary part of FIG. 5.

FIG. 6 illustrates the arrangement of inner circuits of the digital filter 11Y and the decision unit 12Y. For simplicity, the processing of only the signal Y, which is similar to the other two signals PR and PB, will be explained.

Figure 1:
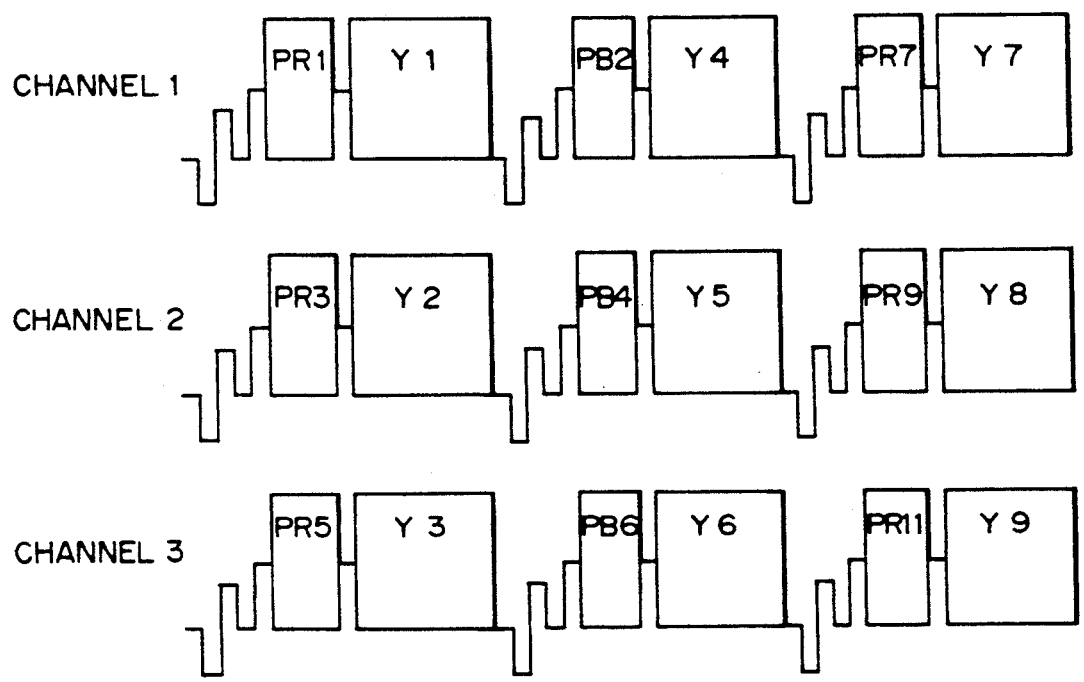
FIG. 1 is a waveform diagram of video signals according to a prior art.
Figure 2:
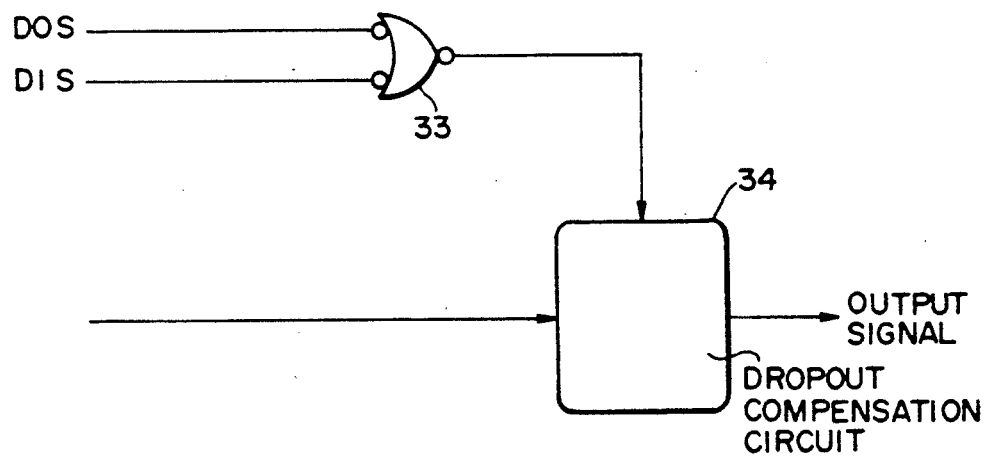
FIGS. 2 to 4 are circuit diagrams of the prior art.
Figure 3:
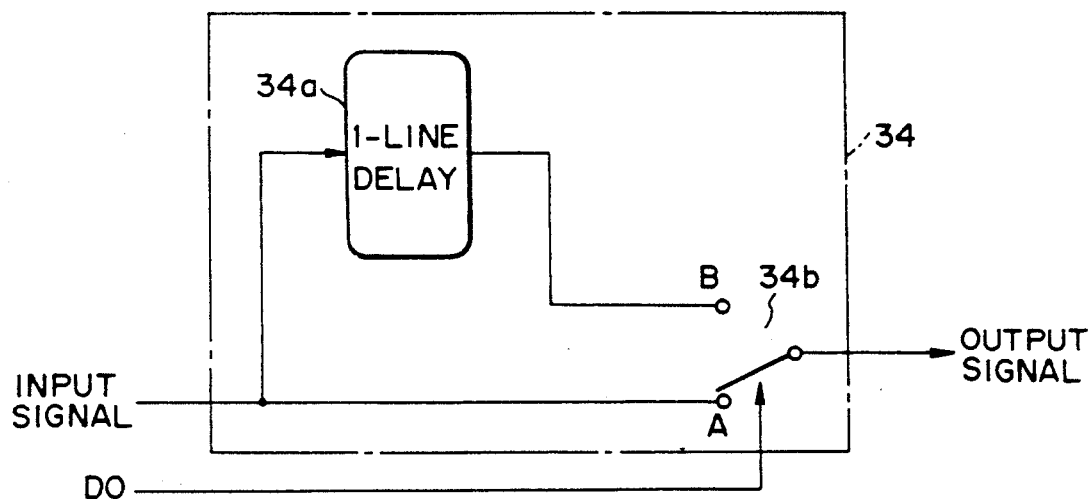

The signal Y (denoted by S1 in FIG. 2) is fed to the A terminal of a switch 15 in the digital filter 11Y. The switch 15 is triggered by the OR signal (referred to as DO hereinafter), either DOS or DIS, for coupling to the A terminal when DO is at logic "1" and the B terminal when at logic "0". An output S2 of the switch 15 is transferred to four one-line delay circuits 16 to 19 aligned in series. As apparent from FIG. 6, a series of signals S2 to S6 represent the Y signals for five consecutive H-lines. The 5 H-line Y signals passing their respective coefficient circuits 20 to 24 are combined together by a summing circuit 25 to farm a composite signal (S7) which is then returned to the B terminal of the switch 15 and also, fed to a sync adder circuit 13Y.

DO is also delivered to the decision unit 12 Y as well as the digital, filter 11Y. The decision unit 12Y is constituted by four one-line delay circuits 26 to 29 and a decision circuit 30. DO is at logic "0" when a dropout is developed or during the disable state and otherwise, normally remains at logic "1". In general, X1=DO where X1 represents the present DO signal. Then, X2 indicates DO of the preceding line and X3, X4, and X5 represent DOs of the lines two, three, and four before the present line. A series of five DOs for the 5 consecutive lines aligned along a time base are, supplied to the decision circuit 30 where each of the 5 H-line DOs is examined to determine whether the logic states are "1" or "0".

After decision operation, resultant decision signals are transferred to their respective coefficient circuits 20 to 24 of the digital filter 11Y for determining corresponding coefficients a to e, respectively. Accordingly, the digital filter 11Y is a non-cyclic digital filter for output of a weighted sum of tap outputs from their respective delay circuits 16 to 19. The operation of the digital filter 11Y in response to identification of the number of consecutively generated DOs will now be described in more detail referring to FIGS. 7 to 10.

FIG. 7-a shows that the second player 1b is in the disable state, in which signals Y2, Y5, and Y(3n−1) for the H-lines are absent. It is known that this can be compensated by interpolation with two, preceding and succeeding, lines. For example, the compensation for absence of Y2 will be given from:

$$Y2 = (\tfrac{1}{2})^* Y1 + (\tfrac{1}{2})^* Y3$$

Figure 8:
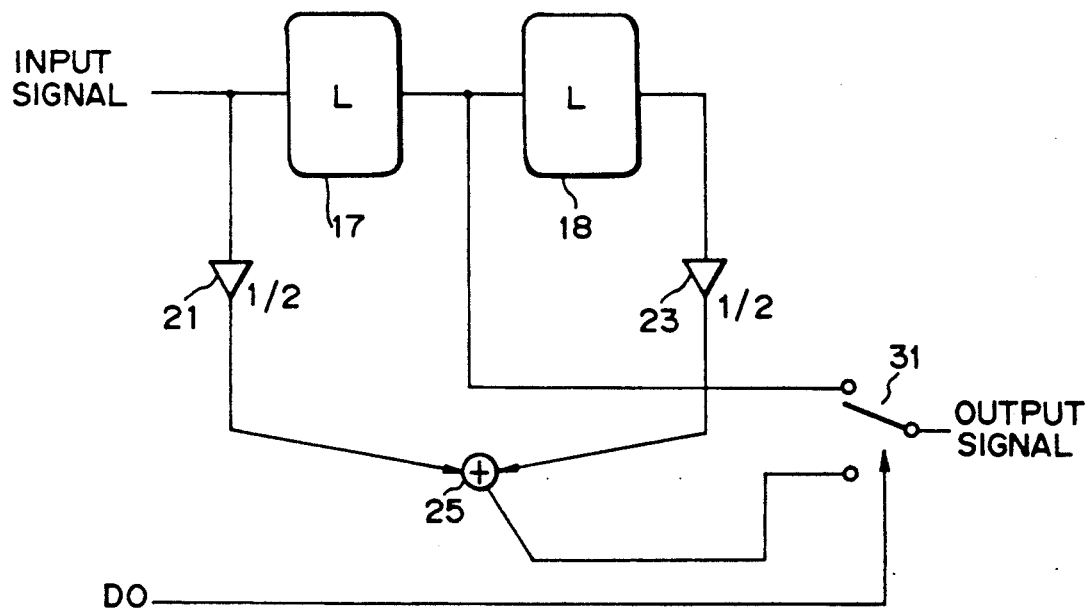
FIGS. 8 and 11 are diagrams of equivalent circuits to the circuit of FIG. 5 in a specific state.

FIG. 8 is a diagram showing a compensation circuit for this operation. More particularly, this can be achieved by designating the coefficients of the coefficient circuits 20 to 24 of the digital filter 11Y as:

$$a = b = d = 0 \text{ and } c = 1 \text{ (if DO} = \text{"1")  or}$$

$$a = c = e = 0 \text{ and } b = d = \tfrac{1}{2} \text{(if DO} = \text{"0")}.$$

FIG. 7-b shows that both the second and third players 1b, 1c are in the disable state, in which Y2, Y3, Y5, Y6, ... Y(3n−1), and Y(3n) are absent. This also can be compensated by calculation of the weighted average using:

$$Y2 = \alpha Y1 + \beta Y4$$

$$Y3 = \beta^* Y1 + \alpha^* Y4$$

Figure 9:
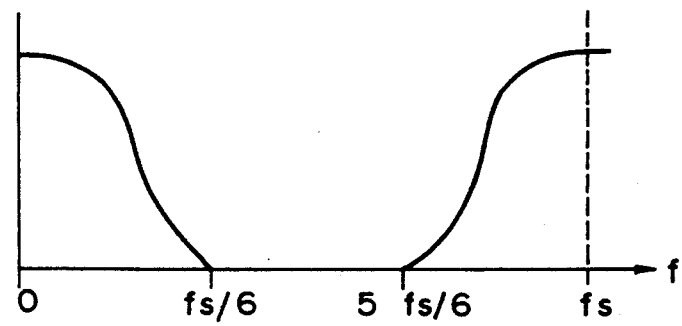
FIG. 9 is a characteristic diagram showing the specific state of the circuit shown in FIG. 5.
Figure 10:
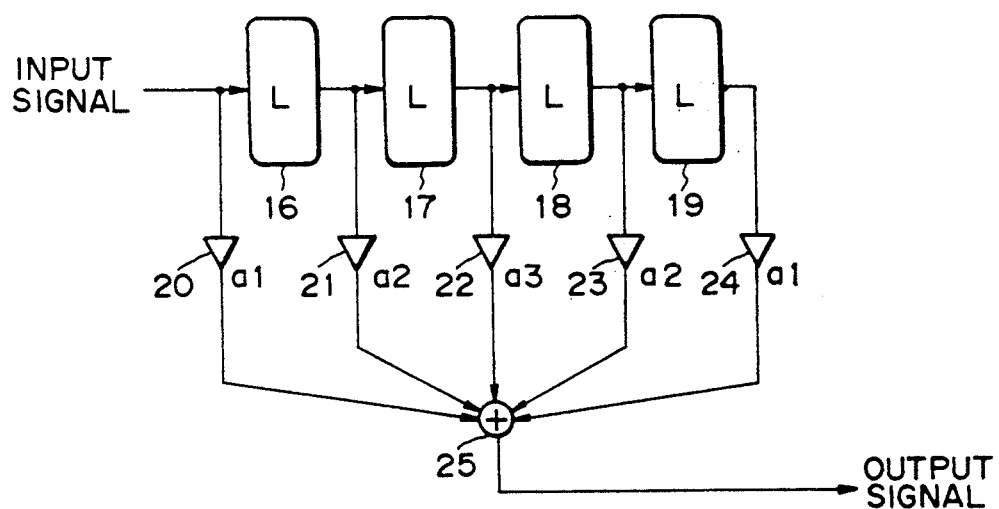
FIG. 10 is a diagram of an equivalent circuit associated with the characteristic diagram of FIG. 9.

The coefficients $\alpha$ and $\beta$ will be calculated by the following manner. First, because one of every three lines carries data (a video signal), the frequency characteristics of a filter which has a cutoff equal to 1/6 the sampling frequency fs in a perpendicular direction (the vertical direction on the screen) are obtained, as shown in FIG. 9. Then, using IFFT (inverse formula for Fourier transform), the characteristic values are truncated by multiplication of a window function in time domain to a finite number (five in this embodiment) of impulse series which become the coefficients of a 5-tap digital filter. It is understood that the filter employed for processing video signals in a frame has a constant phase delay time or is linear in the phase and thus, the coefficients of the filter are preferably symmetrical in arrangement. In practice, the coefficients of five taps are aligned in an order of a1, a2, a3, a2, and a1, as shown in FIG. 10. Generally, the decision circuit 30 and the coefficient circuits 20 to 24 are integrated in the form of, e.g., a ROM. For ease of explanation, the arrangement is herein portrayed as an equivalent circuit.

Figure 11:
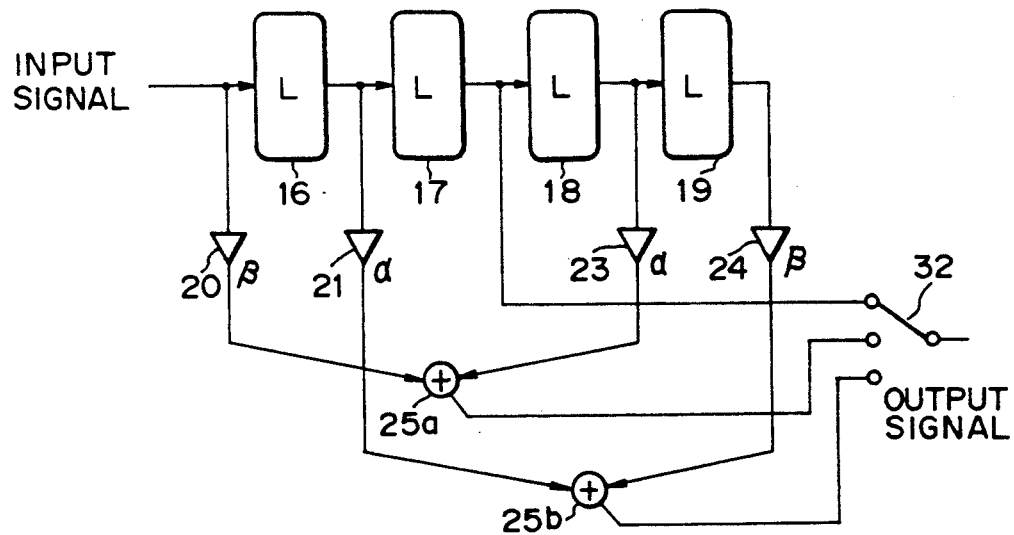
Figure 13A:
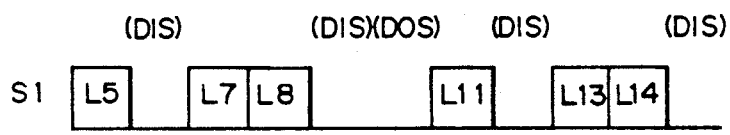
Figure 13B:
Figure 13C:
Figure 13D:
Figure 13E:
Figure 13F:
Figure 13G:
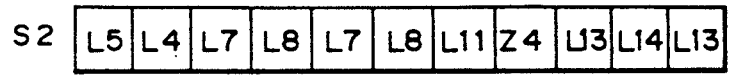
Figure 13H:
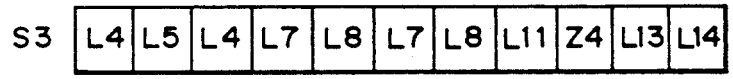
Figure 13J:
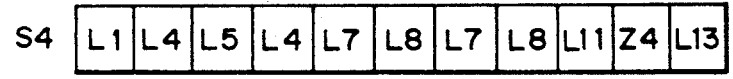
Figure 13K:
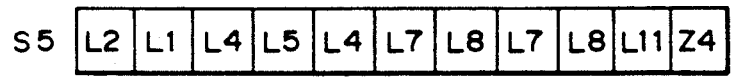
Figure 13L:
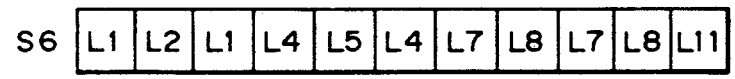
Figure 13M:
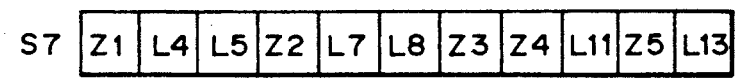

As the input signal carries three different modes, the equivalent circuit for compensation action is expressed as shown in FIG. 11. Accordingly, a switch 32 is triggered for switching action by a decision signal from the decision circuit 30. If a DC gain of the digital filter is 1, then:

$$\alpha = a2/(a1 + a2)$$

$$\beta = a1/(a1 + a2).$$

Figure 4:
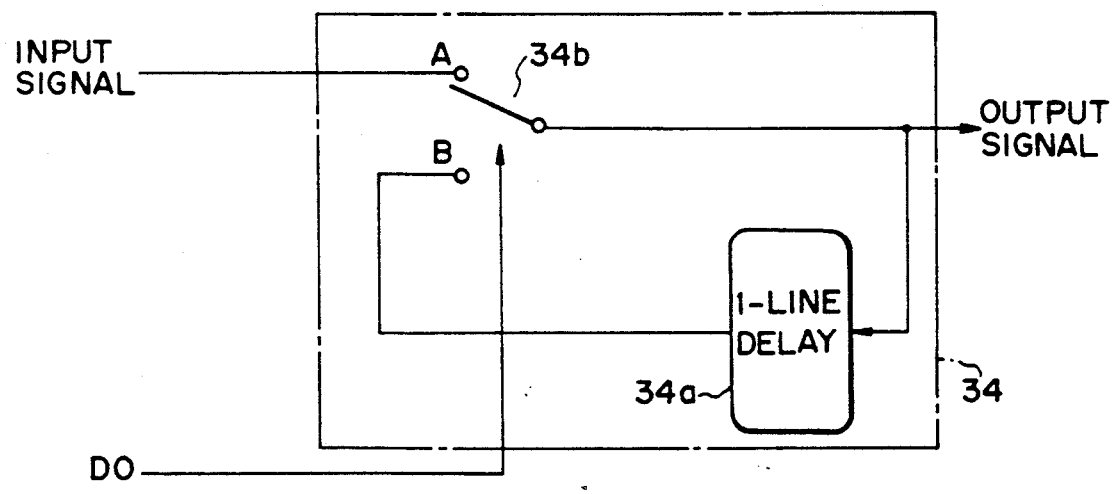

The foregoing is for compensation of video signals when one or two of the players have fallen into the disable state. Also, results from the combination of disable state and dropout are shown in FIGS. 7-c and 7-d. FIG. 7-c illustrates a result from the disable state of one player along with generation of a dropout. FIG. 7-d shows a result from the disable state of two players with signal dropout. The former can be compensated using the circuit arrangement shown in FIGS. 8 and 11. However, the latter may be compensated using the prior art cyclic type compensation circuit shown in FIG. 4, as well as when a series of dropouts are caused. In any case, the circuit arrangement shown in FIG. 6 can compensate for a discrepancy, on the condition that at least a delay time for two lines is needed for determining the number of consecutive DOs.

FIG. 12 is a table showing the relation between the history of feeding of DOS (X1, X2, X3, X4, and X5) into the decision circuit 30 and the coefficients (a, b, c, d, and e) of the digital filter 11Y, in which the coefficients a and b are identical to those shown in FIG. 11. Seven cases represented by I, II, III, IV, V, VI, and VII are established depending on the history of DOs and thus, the tap coefficients of the digital filter 11Y will vary.

The operation of the digital filter 11Y associated with the table of FIG. 12 will then be described in more detail referring to timing charts of FIGS. 13A to 13M and 14A to 14M. S1 to S7 and x1 to x5 represent like signals as shown in FIG. 6. Also, denoted by L1 to L14 are line numbers of a composite video signal. Shown in the bottom are the desired line numbers, from (L3) to (L13), which represent a normal sequence in an accurate output. More specifically, when a line number in the composite signal S7 is equal to the number in the bracket at bottom, its corresponding H-line data is not absent but carried in the video signal.

Also, Z1 to Z5 represent compensated H-line data through compensation using two, preceding and succeeding, lines and thus, can be expressed as:

$$Z1 = (L2 + L4)/2, \; Z2 = (L5 + L7)/2,$$
$$Z3 = \alpha L8 + \beta L11,$$

$$Z4 = \beta L8 + \alpha L11, \text{ and } Z5 = (L11 + L13)/2.$$

The output signal of the digital filter 11Y is delayed by two lines. Hence, when two line delayed DO, i.e. X3, is at logic "1", no compensation is needed because the coefficient c becomes 1 and the others become 0 regardless of the logic of X1, X2, X4, and X5, as apparent from the table of FIG. 12. FIGS. 13A to 13M show that one of the three players is in the disable state and a dropout occurs. When X3 is at logic "1", L4, L5, L7, L8, L11, and L13 of an output signal S4 are correct as unchanged in the signal S7.

When the lines (L3), (L6), and (L12) are absent, X2 and X4 are at logic "1" while X3 is at logic "0" thus representing the case II shown in FIG. 12. The coefficients b and d become ½ and the others become 0. Accordingly, L3 will be compensated using its preceding and succeeding H-lines L2 and L4 as expressed by:

$$L3 = L2/2 + L4/2.$$

In common, if the absent line is L(n), the compensation is executed by:

$$L(n) = L(n-1)/2 + L(n+1)/2.$$

This corresponds with the compensation arrangement shown in FIG. 8.

If two consecutive lines such as (L9) and (L10) are absent, the case III or IV in FIG. 12 is applied. At (L9), X1 and X4 are at logic "1" while X2 and X3 are at logic "0". Hence, the equation is from the table of FIG. 12:

$$L9 = \alpha * L8 + \beta * L11$$

Similarly, at (L10), X2 and X5 are at logic "1" while X3 and X4 are at logic "0". Hence, the equation is:

$$L10 = \beta * L8 + \alpha * L11$$

In general, if the two consecutive absent lines are L(m) and L(m+1), the compensation is executed by:

$$L(m) = \alpha * L(m-1) + \beta * L(m+2)$$

$$L(m+1) = \beta * L(m-1) + \alpha * L(m+2)$$

Those correspond with the compensation arrangement shown in FIG. 11.

FIGS. 14A to 14M show that two of the three players are in the disable state and also, a dropout occurs. Like FIG. 13, when X3 is at logic "1", L7, L10, and L16 are supplied as unchanged. The lines (L5), (L6), (L8), (L9), and (17) are also compensated as:

$$L5 = \alpha * L4 + \beta * L7,$$

$$L6 = \beta * L4 + \alpha * L7,$$

$$L8 = \alpha * L7 + \beta * L10,$$

$$L9 = \beta * L7 + \alpha * L10, \text{ and}$$

$$L17 = \alpha * L16 + \beta * L19.$$

Compensation for discrepancy of five consecutive H-lines (L11), (L12), (L13), (L14), and (L15) which exhibit a series of 5 logic "0" DOs resulting from dropout will now be described.

At (L11), X4 is at logic "1" while X1, X2, and Xa3 are at logic "0". Then, the coefficient d becomes 1 and the others become 0. Accordingly, L10 from a signal S5 is appropriated. Also, as the switch 15 shown in FIG. 16 is connected to the B terminal, S2 carries L10. At (L12), X5 is at logic "1" while X2, X3, and X4 are at logic "0". The coefficient e becomes 1 and the others become 0. Accordingly, L10 from S6 is appropriated. S2 again carries L10 and its L10 data is given to S3. At (L13), X3, X4, and X5 are at logic "0". The coefficient c becomes 1 and the others become 0. Then, data from S4 which is identical to L10 of S3 at (L12) is appropriated. Accordingly, (L13) is filled with L10. Similarly, (L14) and (L15) are filled with L10. As the result, 5 consecutive logic "0" DOS exhibiting the absence of a row of 5 H-line video signals can be compensated with the preceding video signals. More particularly, Z1, Z2, Z3. Z4, Z5, and Z6 in FIG. 10 are expressed as:

$$Z1 = \beta L1 + \alpha L4, Z2 = \alpha L4 + \beta L7,$$

$$Z3 = \beta L4 + \alpha L7, Z4 = \alpha L7 + \beta L10,$$

$$Z5 = \beta L7 + \alpha L10, \text{ and } Z6 = \alpha L16 + \beta L19.$$

As apparent from the table of FIG. 12, if more than 3 consecutive H-lines are absent, compensation will be carried out using data of the preceding H-lines.

Although this embodiment is described with the use of three players, two, or more than 3 players, may be employed with equal success.

As set forth above, a recording medium playback apparatus according to the present invention provides, during production of a composite video signal by combining a multiplicity of H-line video signals reproduced from playback of a plurality of recording media which carry different video signals respectively, a compensation procedure which comprises the steps of generating a discrepancy signal if the absence of an H-line video signal in the composite video signal is detected, examining the number of the consecutive discrepancy signals, and conducting compensation with the use of an interpolation signal produced from preceding and succeeding H-line signals if the number is not more than a given value or with the holding of the preceding H-line signal prior to absent H-lines if the number is more than the given value so that an image exhibiting less vertical foldover can be reproduced.

What is claimed is:

1. A recording medium playback apparatus having a plurality of players for playback of their respective recording media carrying different video signals and a composite means for producing a composite video signal by combining a multiplicity of video signals, each being assigned to an H-line, reproduced with the players, comprising:

discrepancy detecting means for producing a discrepancy signal upon appearance of a defective H-line video signal in the video signals reproduced from the recording media; and compensating means for compensating for the defective H-line video signal in the composite video signal in accordance with the discrepancy signal, said compensating means being arranged so that after a number of the consecutive discrepancy signals is examined, compensation for the defective H-line video signals is executed with the use of an interpolation signal produced from two, preceding and succeeding, H-line video signals if the number is not more than a given value and with the holding of the preceding H-line video signals if the number is more than the given value.

2. The recording medium playback apparatus according to claim 1, wherein the discrepancy detecting means is provided in each of said players.

3. The recording medium playback apparatus according to claim 1, or 2, wherein the discrepancy detecting means produces a dropout detection signal or a disable signal as the discrepancy signal.

4. A method for compensating for discrepancies in a recording medium playback apparatus having a plurality of players for playback of their respective recording media carrying different video signals and a composite means for producing a composite video signal by combining a multiplicity of video signals, each being assigned to an H-line, reproduced with the players, said method comprising the steps of:

generating a plurality of discrepancy signals, each of said discrepancy signals being generated in response to appearance of a defective corresponding H-line video signal in the video signals reproduced from the recording media;

determining a total number of said discrepancy signals;

conducting compensation using an interpolation signal produced from a preceding H-line video signal and a succeeding H-line video signal when said total number of said discrepancy signals is not more than a given value; and conducting compensation by holding the preceding H-line video signal if said total number of said discrepancy signals is more than the given value.

5. The method of claim 4, wherein said generating step further comprises the step of generating said discrepancy signals for each of said players in said recording medium playback apparatus.

6. The method of claim 5, wherein said generating step comprises the steps of:

producing a dropout detection signal in response to dropout of a signal from one of said players;

providing a disable signal in response to disabling of said signal from one of said players; and combining said dropout detection signal and said disable signal to produce said discrepancy signal.

7. The method of claim 4, wherein said generating step comprises the steps of:

producing a dropout detection signal in response to dropout of a signal from one of said players;

providing a disable signal in response to disabling of said signal from one of said players; and combining said dropout detection signal and said disable signal to produce said discrepancy signal.

8. A recording medium playback apparatus having a plurality of players for playback of their respective recording media carrying different video signals and a composite means for producing a composite video signal by combining a multiplicity of video signals, each being assigned to an H-line, reproduced with the players, comprising:

a discrepancy detecting circuit for producing a discrepancy signal in response to appearance of a defective H-line video signal in the video signals reproduced from the recording media;

a filter circuit for compensating for the defective H-line video signal in the composite video signal based on said discrepancy signal, said filter circuit being characterized in that, after a predetermined number of consecutive discrepancy signals is examined and a total number of said discrepancy is determined, compensation for the defective H-line video signals is executed with the use of an interpolation signal produced from a preceding H-line and a succeeding H-line video signal if said total number is not more than a given value and with the holding of the preceding H-line video signals if said total number is more than the given value.

9. The recording medium playback apparatus according to claim 8, wherein the discrepancy detecting circuit is provided in each of said players.

10. The recording medium playback apparatus according to claim 9, wherein the discrepancy detecting circuit produces at least one of a dropout detection signal and a disable signal as the discrepancy signal.

11. The recording medium playback apparatus according to claim 8, wherein the discrepancy detecting circuit produces at least one of a dropout detection signal and a disable signal as the discrepancy signal.

12. The recording medium playback apparatus according to claim 8, wherein said filter circuit comprises a multiple tap filter including a plurality of line delay elements for producing a weighted sum of tap outputs from said line delay elements and wherein weighting coefficients of said tap filter are based on said discrepancy signals.

13. A recording medium playback apparatus having a plurality of players for playback of their respective recording media carrying different video signals and composite means for producing a composite video signal by combining a multiplicity of video signals, each being assigned to an H-line, reproduced with the players, comprising:

discrepancy detecting means for producing a discrepancy signal upon appearance of a defective H-line video signal in the composite video signal reproduced from the recording media; and compensating means for compensating the defective H-line video signal in the composite video signal in accordance with the discrepancy signal, said compensating means including:

first memory means for memorizing a predetermined number of the consecutive H-line video signals;

second memory means for memorizing corresponding ones of said discrepancy signals with respect to the memorized H-line video signals; and calculation means for multiplying the memorized H-line video signals with corresponding coefficients and summing the multiplied H-line video signal with each other so as to produce a compensated H-line video signal, said corresponding coefficients being provided in response to said discrepancy signals.

* * * * *